Figure 1:
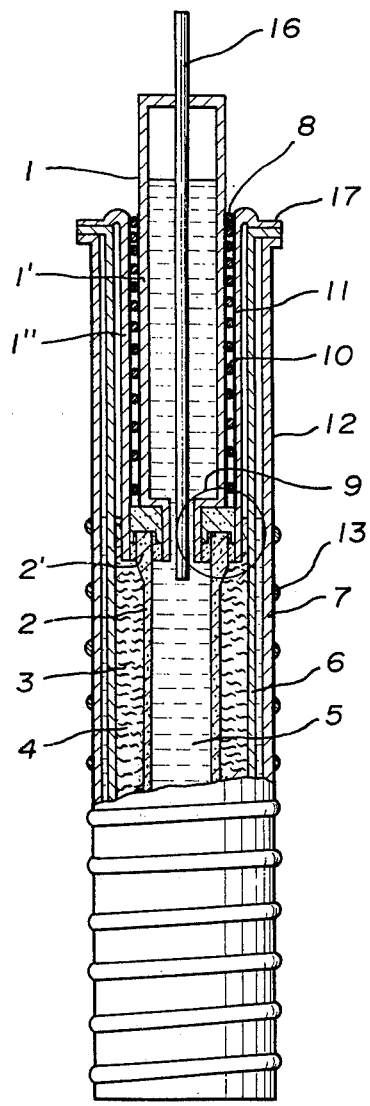

United States Patent
Kagawa

[11] 4,024,319
[45] May 17, 1977

[54] SODIUM-SULFUR STORAGE BATTERY
[75] Inventor: Hiroshi Kagawa, Takatsuki, Japan
[73] Assignee: Agency of Industrial Science & Technology, Tokyo, Japan
[22] Filed: Sept. 15, 1975
[21] Appl. No.: 613,222
[30] Foreign Application Priority Data
Oct. 8, 1974  Japan .................... 49-115235
[52] U.S. Cl. ............................................. 429/104
[51] Int. Cl.² ............................................. H01M 4/36
[58] Field of Search ................ 136/6 FS, 6 F, 6 R, 136/83 R, 83 T, 143, 181; 429/104, 102
[56] References Cited
UNITED STATES PATENTS 3,458,356  7/1969  Kummer et al. .............. 136/6 FS X
3,679,480  7/1972  Brown et al. ...................... 136/6 FS
3,837,918  9/1974  Nahabayshi ....................... 136/6 FS Primary Examiner—C. F. Lefevour
Attorney, Agent, or Firm—Pierce, Scheffler & Parker

[57] ABSTRACT

This invention relates to a novel sodium-sulfur storage battery comprising a sodium reservoir made of metal incorporating a heater between double walls, a solid electrolyte connected thereto, an anodic reactant contained therein and a cathode reactant contained thereout, and a battery housing which contains the above-mentioned components and being sealed at the upper part thereof. According to this invention, a sodium-sulfur storage battery having superior performance, longer service life, and of low price is obtainable.

1 Claim, 2 Drawing Figures

U.S. Patent

May 17, 1977

4,024,319

SODIUM-SULFUR STORAGE BATTERY

This invention relates to a novel sodium-sulfur storage battery. A sodium-sulfur storage battery generally comprises molten sulfur or molten sodium polysulfide as a cathodic reactant, molten sodium as an anodic reactant, and a non-porous solid electrolyte, made of special ceramic as a solid electrolyte, which permits only sodium ions to pass. The battery is one which operates at a temperature of approximately 350° C., thereby generating electrical energy according to the following electromotive reaction:

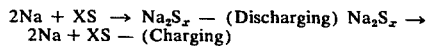

$$2Na + XS \rightarrow Na_2S_x - \text{(Discharging)} \ Na_2S_x \rightarrow$$
$$2Na + XS - \text{(Charging)}$$

Heretofore, a heater has been arranged around the outside of the housing of this type of battery in order to warm the battery up to a working temperature, so that an anodic reactant melts only after a cathodic reactant has molten. Sulfur as the cathodic reactant has an inferior thermal conductivity and requires a considerably long time until it melts completely. Further, since the anodic reactant is gradually molten from outside only by the function of the heater arranged thereabout, the battery has had — amongst others — the following disadvantages: Many stresses act on the solid electrolyte until a cathodic reactant which still solidifies at around the solid electrolyte melts completely. The solid electrolyte having a considerably low mechanical strength is broken. And, especially, a joint between the solid electrolyte and the metallic reservoir for sodium is broken. Moreover, there has been the disadvantage that temperature control of the interior of the battery has been difficult, as it is heated from outside the battery housing.

An object of the present invention is to obviate all of the above-mentioned disadvantages, and a further inventive object of the invention is to provide a sodium-sulfur storage battery having an excellent performance.

Another object of the invention is to provide a sodium-sulfur storage battery having a long service life.

A still further inventive object is to provide a sodium-sulfur storage battery which is simple in fabrication and inexpensive in cost.

Figure 2:
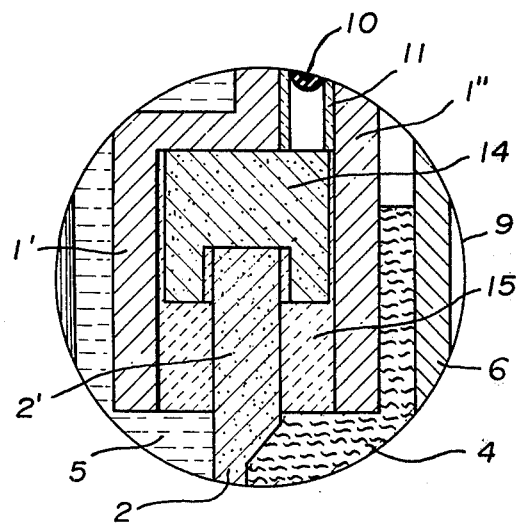

The invention will be better understood from the following description taken in connection with the accompanying drawings, in which:

FIG. 1 is a vertical sectional view of the sodium-sulfur storage battery of this invention; and FIG. 2 is an enlarged view of an essential part of FIG. 1.

In the figures, 1 is a double-walled sodium reservoir made of metal, double walls of which comprise an inner wall 1' made of metal such as Ni-Fe alloy having sufficient resistance to chemical and electrochemical attack by molten sodium, and an outer wall 1'' made of stainless steel or the like. The inner and outer walls are electrically insulated from each other. 2 is a non-porous solid electrolyte made of ceramic such as β-alumina, which permits only sodium ions to pass. 3 is an electric conductor of carbon felt which is impregnated with a cathodic reactant 4 such as sulfur or sodium polysulfide, and arranged at the outside of the solid electrolyte 2.

5 is sodium for the anodic reactant contained in the solid electrolyte 2 and in the metallic reservoir 1 for sodium metal 6 is a cathodic collector made of stainless steel or molybdenum steel in strip form, plural pieces of which being fixed to, and around, the electric conductor 3 made of carbon felt.

7 is a battery housing made of stainless steel also serving as a cathode. At an outward flange of an upper part thereof, an upper flanged portion of the outer wall 1'' of the sodium reservoir 1 made of metal and an upper bent portion of the cathodic collector 6 are welded to each other. 8 is an insulator disposed in the double walls of the sodium reservoir, a terminal of a heater 10 being led out from a part thereof. 9 is a jointing part of the sodium reservoir 1 and the solid electrolyte 2, an enlarged view of the jointing part being illustrated in FIG. 2.

10 is a heater made of nickel-chromium alloy wire, which is incorporated between the inner wall 1' and the outer wall 1'' of the sodium reservoir 1, the heater being insulated from both walls by a heat-resisting insulator 11. The heat-resisting insulator 11 may be either a double-walled mica cylinder incorporating the ribbon-type heater 10, or a glass tube incorporating a sheathed heater. In the former case, the ribbon-type heater is spirally wound around an inner mica core and is covered by another, outer, mica shell thereon. In the case of the latter, the sheathed heater inserted into the glass tube is spirally wound around the inner wall 1' of the sodium reservoir 1. The heater 10 is connected to an electric source which is not shown. 12 is a glass tube around the battery housing 7, and 13 is an outer heater spirally wound around the exterior surface of glass tape 12. The outer heater 13 is also connected to an electric source not shown.

14 is an insulating ring which may be formed of α-alumina, and 15 is a solder glass. They are arranged at the jointing part 9 of the sodium reservoir and the solid electrolyte 2. At the bottom end of the double walled sodium reservoir 1, the inner wall 1' bends to the center and diminishes in diameter, then extends downward. Thus, a gap between the double walls forms a space sufficient to accommodate a thick wall part 2' mounted on top of the solid electrolyte 2. 16 is an anodic terminal, and 17 is a cathodic terminal made of stainless steel.

A feature of the present invention is the heater 10 incorporated between the double walls of the metallic reservoir for sodium.

Another feature of this invention relates to the said heater 10, windings of which are relatively close together on the upper part and relatively farther apart on the lower part, with the winding pitch thereof changed gradually and smoothly between the extremes.

An additional feature of this invention relates to the solid electrolyte 2, the upper part of which is formed into a thick wall as shown by the thick wall part 2' in the figures.

According to the present invention, many prominent advantages are obtainable as follows:

(1) Since the heater 10 is provided within the battery, the thermal energy generated from the heater 10 is effectively utilized to melt the cathodic and anodic reactants 4 and 5 without being released outward; thus, temperatures thereof are able to be raised to a working temperature of the battery in a relatively very short time.

(2) Since the anodic and cathodic reactants 5 and 4 are heated simultaneously, these reactants are molten from above, volume changes due to expansion of the reactants are absorbed into and cushioned by an upper space, thus stresses tending to accumulate on the solid electrolyte — having a relatively small mechanical strength — being removed.

(3) Since the anodic reactant 5 having superior thermal conductivity to the cathodic reactant 4 is molten faster than the cathodic reactant, and since the cathodic reactant 4, which exists around the solid electrolyte 2 made of $\beta$-alumina at the same time is still solidifying or maintained in the solid state, is heated and molten from inside; troubles caused by collapse of the said solid electrolyte 2 as recognized hitherto is almost completely obviated. Further, since the upper part of the solid electrolyte 2 is formed into the thick wall part 2', a collapse is still further avoided.

According to the present invention as mentioned above, many prominent advantages are provided: i.e. a working temperature of the storage battery can be easily controlled, and the battery can be operated more effectively and in normal state.

It is to be understood that this invention is not limited to the examples herein shown and described, but that changes and modifications may be made without departing from the spirit and scope of the invention, as defined in the appended claims.

I claim:
1. A sodium-sulfur storage battery comprising
    a double-walled sodium reservoir (1), made of metal, having an inner wall (1') and an outer wall (1") said inner and outer walls being electrically insulated from each other,
    said inner wall (1') having an upper part and a lower part which upper part has a diameter larger than that of said lower part to provide an annular space;
    an electric heater (10) between the double walls of said reservoir and insulated from both of said walls by a heat-resisting insulator (11), the windings of the heater being relatively closer together adjacent the upper part, and relatively farther apart adjacent the lower part, of said reservoir with the winding pitch thereof changed gradually and smoothly between them;
    an annular solid electrolyte (2) in communication with said reservoir through the narrowed inner wall (1'), said electrolyte being formed into a thickened wall (2') at a joint (9) with said reservoir and mounted on the top of solid electrolyte (2), the outer diameter of said electrolyte gradually increasing to form thickened part (2') at the upper part thereof,
    said thickened part being received in an annular groove of an insulating ring (14);
    said thickened part (2') and the bottom end of said reservoir being secured together by solder glass (15);
    sodium as anodic reactant (5) contained in said reservoir and said electrolyte;
    sulfur or sodium polysulfide as cathodic reactant (4) contained about the solid electrolyte (2) the level of which reactant is no higher than said joint (9),
    said cathodic reactant being infiltrated in carbon felt (3) as electrical conductor, outside of which is fastened by cathodic collector (6), connected to cathodic terminal (17) at its upper part;
    a battery housing (7) which contains the above-mentioned components and is sealed at the upper part thereof;
    an anodic terminal (16) disposed centrally in the sodium reservoir, the upper part of which terminal passes through the top part of said reservoir and is sealed therein and the lower end of which terminal passes through the bottom of said inner wall and enters into the solid electrolyte; and
    an outside heater (13) surrounding the battery housing (7) below the level of cathodic reactant (4).

* * * * *